United States Patent
Biggs et al.

(10) Patent No.: US 8,284,232 B2
(45) Date of Patent: Oct. 9, 2012

(54) EQUALIZATION OF VIDEO STREAMS

(75) Inventors: Kent E Biggs, Tomball, TX (US);
Thomas J Flynn, Magnolia, TX (US);
Robert P Martin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 12/363,652

(22) Filed: Jan. 30, 2009

(65) Prior Publication Data
US 2010/0194846 A1    Aug. 5, 2010

(51) Int. Cl.
*H04N 7/14* (2006.01)
(52) U.S. Cl. .............. 348/14.08; 348/14.09; 348/14.1; 348/14.11; 348/14.12; 348/14.13; 379/202.01
(58) Field of Classification Search .......... 348/14.08, 348/14.09, 14.1; 379/202.01–207.01; 709/204
See application file for complete search history.

(56) References Cited

U.S. PATENT DOCUMENTS

| | | | | |
|---|---|---|---|---|
| 6,236,433 B1 * | 5/2001 | Acharya et al. | ............... | 348/273 |
| 6,693,661 B1 * | 2/2004 | Vanderwilt et al. | ......... | 348/14.01 |
| 6,965,399 B1 * | 11/2005 | Oka et al. | ................. | 348/211.99 |
| 6,989,856 B2 * | 1/2006 | Firestone et al. | .......... | 348/14.09 |
| 7,236,629 B2 * | 6/2007 | Cooper et al. | ................ | 382/171 |
| 7,903,898 B2 * | 3/2011 | Ito et al. | ........................ | 382/254 |
| 2004/0207760 A1 * | 10/2004 | Filliman et al. | ............... | 348/678 |
| 2005/0185836 A1 * | 8/2005 | Huang | ........................... | 382/162 |
| 2005/0213739 A1 * | 9/2005 | Rodman et al. | .......... | 379/202.01 |
| 2008/0259223 A1 * | 10/2008 | Read et al. | .................... | 348/745 |
| 2009/0059083 A1 * | 3/2009 | Aoki et al. | .................... | 348/674 |

* cited by examiner

*Primary Examiner* — Joseph J Nguyen

(57) ABSTRACT

A method equalizing video signals transmitted across a network is provided. The method can include introducing one or more captured video signals across a network via a plurality of conferencing devices. The conferencing devices can include a video display device adapted to display a received video signal, and a video capture device adapted to provide a captured video signal. One or more modules can be disposed in, on, or about the network, the video display device, the video capture device, or any combination thereof. One or more parameters of the video signals transmitted across the network can be modified via the one or more modules such that the one or more modified display parameters of all or a portion of the video signals transmitted across the network fall within a predetermined parameter range.

17 Claims, 3 Drawing Sheets

EQUALIZATION OF VIDEO STREAMS

BACKGROUND OF THE INVENTION

1. Field of the Invention

Embodiments of the present invention generally relate to signal processing. More specifically, embodiments of the present invention relate to video signal processing.

2. Description of the Related Art

Conferences more frequently being conducted "virtually" by remote parties using networked conferencing devices, i.e. via video conferencing, rather than the more traditional "face-to-face" conference. Video conferencing efficiently provides widely dispersed conference attendees the opportunity to participate in a single, usually virtual, interactive forum from remote locations. Unfortunately, the display parameters of the video signals provided by the video capture devices used by each conference attendee can vary widely, lending a "patch-work" appearance of conference attendees on any single attendee's conferencing device.

SUMMARY OF THE INVENTION

A method equalizing video signals transmitted across a network is provided. The method can include introducing one or more captured video signals across a network via a plurality of conferencing devices. Each conferencing device can include a video display device adapted to display a received video signal, and a video capture device adapted to provide a captured video signal. One or more modules can be disposed in, on, or about the network, the video display device, the video capture device, or any combination thereof. One or more parameters of the video signals transmitted across the network can be modified via the one or more modules such that the one or more modified display parameters of all or a portion of the video signals transmitted across the network fall within a predetermined parameter range.

A system for equalizing video signals transmitted across a network is also provided. The system can include a plurality of conferencing devices, each adapted for the bi-directional communication of one or more video signals across a network. Each video conferencing device can include a video display device suitable for the display one or more received video signals across the network, and a video capture device suitable for the provision of a captured video signal. One or more modules suitable for modifying one or more display parameters of the video signals transmitted across the network can be disposed in, on, or about the network, the video display device, the video capture device or any combination thereof. In one or more embodiments, the one or more modified display parameters of all or a portion of the video signals transmitted across the network can fall within a predetermined parameter range. In addition, each video conferencing device can optionally include one or more of the following: a color space converter adapted to translate or otherwise convert the color space of all or a portion of the signal; one or more encoders adapted to encode, translate, or modulate the captured video signal; one or more decoders adapted to decode, translate, or demodulate the received video signal; and one or more video scaling devices.

As used herein, the term "display parameter" or the plural "display parameters" can refer to any quantity, variable, component, criterion or similar characteristic that defines all or a portion of a digital or analog video signal. Exemplary display parameters can include, but are not limited to, chroma, luma, brightness, color level, color temperature, red level, blue level, green level, hue, white balance, or any combination or ratio thereof.

As used herein, the term "captured video signal" can refer to any signal, digital or analog, containing, all or in part, video information. Captured video signals can include signals generated or otherwise provided by still cameras, movie cameras, charge-coupled devices (CCDs, both still and motion), or any combination thereof.

As used herein, the term "received video signal") can refer to any signal, digital or analog, containing, all or in part, video information that is received or otherwise captured by a device suitable for the display of at least a portion of the video information contained in the signal.

As used herein, the term "video signal" can refer to any signal, analog or digital, containing, all or in part, video information.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
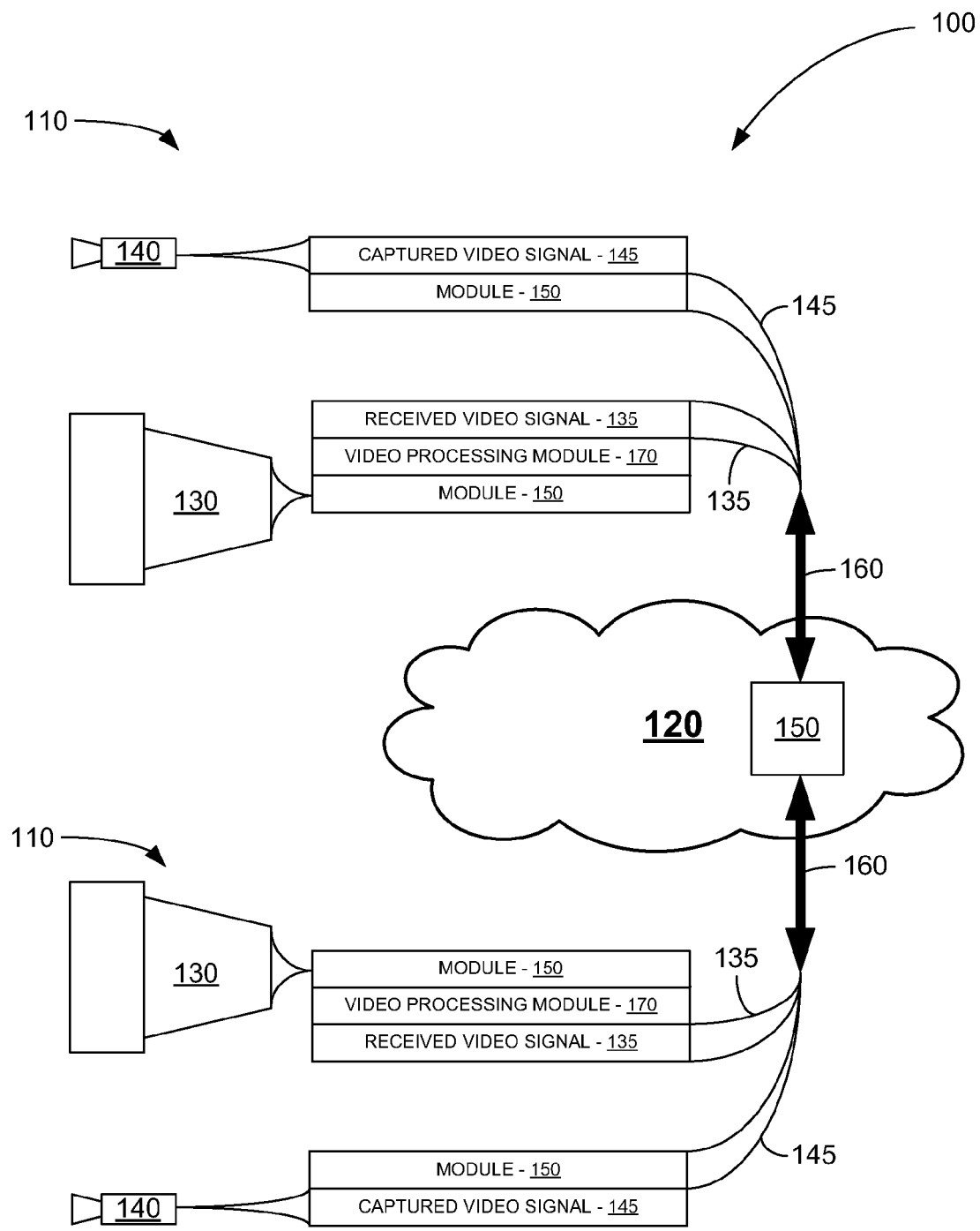
FIG. 1 is a schematic view depicting an illustrative method for equalizing video signals across a network, according to one or more embodiments described herein.

FIG. 1 is a schematic depicting an illustrative system 100 for equalizing video signals across a network, according to one or more embodiments. A plurality of conferencing devices 110 can be operably coupled via one or more networks 120. Each of the one or more conferencing devices 110 can include one or more video display devices 130 suitable for displaying one or more received video signals 135, and one or more video capture devices 140 suitable for providing a captured video signal 145. The received video signals 135 and captured video signals 145 can be transmitted to every conferencing device 110, to provide a plurality of video signals 160 transmitted across the network 120.

All or a portion of the plurality of video signals 160 transmitted across the network 120 can be introduced to one or more modules 150 disposed in, on, or about the one or more networks 120, the one or more video display devices 130, the one or more video capture devices 140, or any combination thereof. In one or more embodiments, the one or more modules 150 can adjust or otherwise alter one or more video display parameters to fall within one or more predetermined ranges. By adjusting one or more display parameters to fall within the one or more predetermined ranges, all or a portion of the video signals 160 can be made to appear to originate from a location featuring similar or identical ambient characteristics, regardless of the actual ambient characteristics in each location. By providing a similar appearance to each conference attendee, i.e., each user of a conferencing device 110 displaying one or more received video signals, each of the conference attendees can experience a more uniform "conference room-like" environment.

The one or more networks 120 can include, but are not limited to, any network used to operatively couple two or more conferencing devices. In one or more specific embodiments, the network 120 can be as simple as a single network cable, for example an Ethernet cable, connecting two wired conferencing devices. In one or more embodiments, the network 120 can be as large and/or complex as the worldwide web (i.e., the "internet") connecting millions of conferencing devices via a complex network containing literally millions of switches, hubs and routers. In one or more specific embodiments, the network 120 can include a local area network, a wide area network or a cellular network. In one or more embodiments, the network 120 can contain wired devices exclusively, for example a plurality of wired Ethernet devices. In one or more embodiments, the network 120 can contain wireless devices exclusively, for example a plurality of cellular or IEEE 802.11 (i.e., "WiFi") compliant devices. In one or more embodiments, the network 120 can contain both wired and wireless devices. In short, any type of wired and/or wireless network topography suitable for the transmission of analog and/or digital video signals can be used with equal efficacy.

The one or more video display devices 130 can include one or more devices, systems, or any combination of systems and/or devices suitable for displaying the one or more received video signals 135. In one or more specific embodiments, the video display device 130 can include, but is not limited to, one or more cathode ray tube ("CRT") displays, one or more gas plasma displays, one or more liquid crystal displays ("LCD"); one or more light emitting diode ("LED") displays, one or more organic light emitting diode ("OLED") displays, or any similar device suitable for the display of one or more analog and/or digital video signals.

The one or more video capture devices 140 can include one or more devices, systems, or any combination of systems and/or devices suitable for providing the one or more captured video signals 145. In one or more specific embodiments, the video capture device 140 can include, but is not limited to, one or more video cameras, one or more still cameras, or the like. The video capture device 140 can transmit or otherwise broadcast a captured analog or digital video signal at least partially composed of data containing the captured image. In one or more embodiments, the video capture device 140 can transmit, encode, embed, multiplex, or otherwise include physical data related to one or more characteristics of the video capture device 140 within the captured video signal 145. Exemplary physical data related to the video capture device 140 can include, but is not limited to, camera type, CCD type, CCD resolution, CCD manufacturer, overall focal length range of lens, focal length of lens at the time the image was captured, focus distance, and the like.

The one or more modules 150 can include one or more devices, systems, or any combination of systems and/or devices suitable for adjusting one or more display parameters of all or a portion of the video signals 160 transmitted across the one or more networks 120. In one or more embodiments, the one or more modules 150 can modify or otherwise adjust one or more display parameters of all or a portion of the video signals 135 received by the one or more video display devices 130. In one or more embodiments, the one or more modules 150 can modify all or a portion of the video signals 145 captured by the one or more video capture devices 140. In one or more embodiments, the one or more modules 150 can modify all or a portion of the video signals 160 transmitted across the one or more network 120. In one or more embodiments, the one or more modules 150 can adjust one or more display parameters including, but not limited to, color level, color temperature, contrast, brightness, white balance, sharpness, depth of field, facial recognition and sizing, or any combination thereof.

In one or more embodiments, the one or more modules 150 can adjust or otherwise modify all or a portion of the display parameters to fall within the one or more predetermined ranges selected by the user of the conferencing device 110. For example, the conferencing system user can enter a desired contrast range, a desired brightness range, a desired color temperature, and a desired facial size thereby providing the one or more predetermined ranges. In one or more embodiments, the one or more modules 150 can then adjust or modify every received video signal 135 such that the image provided by the received video signal 135 on the video display device 130 falls within the one or more predetermined ranges.

In one or more embodiments, the one or more modules 150 can adjust or otherwise modify all or a portion of the display parameters based upon one or more display parameters captured from the local captured video signal 145, e.g., the captured video signal provided by the user's local conferencing device 110. For example, one or more display parameters can be sensed or otherwise detected by the local video capture device 140, including, but not limited to, color level, color temperature, contrast, brightness, white balance, sharpness, depth of field, or any combination thereof. Based upon the display parameters detected by the video capture device 140, the one or more modules 150 can determine, set, or otherwise allocate all or a portion of the one or more predetermined ranges. In a similar manner, physical characteristics of the video capture device, including, but not limited to focal range, focal length, effective aperture, depth of field, and the like can be used to provide all or a portion of the one or more display parameters. In one or more embodiments, the one or more modules 150 can then adjust or modify all or a portion of the one or more video signals 133, 145, or 160 such that the modified video signal falls within the predetermined ranges based, all or in part, upon the one or more display parameters captured using the video capture device 140.

In one or more embodiments, the one or more modules 150 can adjust or otherwise modify all or a portion of the display parameters to fall within one or more default predetermined ranges stored within the one or more modules 150, the one or more networks 120, the one or more video display devices 130, the one or more video capture devices 140, or within any combination thereof. In one or more embodiments, the use of default parameters can be facilitated when a user of the conferencing system 110 has not specified one or more required parameter ranges and the parameter ranges provided by the video capture device 140 do not fall within acceptable limits, for example when the image captured by the video capture device 140 is too bright, too dark, color shifted, or the like. In one or more embodiments, the use of default parameters can be facilitated when the conferencing system user has specified the use of one or more unavailable captured video display parameters, for example when captured video display parameters are specified and the video capture device has malfunctioned or is otherwise unable to provide a captured video signal 145. has not specified parameter ranges and the parameter ranges provided by the video capture device 140.

In one or more embodiments, the one or more modules 150 can adjust or otherwise modify all or a portion of the display parameters to fall within one or more predetermined ranges selected based upon one or more display parameters captured from one or more remote captured video signals 145, i.e., the captured video signal provided by one or more remote conferencing devices 110. For example, a conference attendee may select one received video signal 135 displayed on their local conferencing device 110 as the source for one or more parameter ranges based upon the captured video signal provided by the selected remote video capture device 140.

In one or more embodiments, the one or more modules 150 can be disposed in, on, or about the one or more networks 120. For example, the one or more modules can be disposed in, on, or about one or more servers directing video signal traffic across the one or more networks 120. All or a portion of the one or more video signals 160 routed across the network 120 can be routed, switched, passed, or otherwise introduced to the one or more modules 150 disposed in, on, or about the network 120. Such an installation can improve the responsiveness of the user's conferencing devices 110 by offloading a significant portion of the video signal processing from the conferencing devices 110 to one or more centralized servers having comparably greater computational capabilities.

In one or more embodiments, the one or more modules 150 can be disposed in, on, or about the one or more video display devices 130. All or a portion of the one or more received video signals 135 introduced to the video display device 130 can be routed, switched, passed, or otherwise introduced to the one or more modules 150 disposed in, on, or about the video display device 130.

In one or more embodiments, the one or more modules 150 can be disposed in, on, or about the one or more video capture devices 140. All or a portion of the one or more captured video signals 145 transmitted by the video capture device 140 can be routed, switched, passed, or otherwise introduced to the one or more modules 150 disposed in, on, or about the video capture device 140.

In one or more embodiments, one or more video processing modules 170 can be distributed in, on, or about the one or more video display devices 130, the one or more video capture devices 140, or any combination thereof. The one or more video processing modules 170 can include, but are not limited to, one or more analog-to-digital ("A-D") converter modules; one or more coding modules to encode the signal into any desired transmission format; one or more decoding modules to decode the signal from the transmission format to a format suitable for display; one or more encryption modules to securely encrypt the signal content; one or more decryption modules to restore an encrypted signal to a readable format; one or more color space conversion modules, for example a color space correction module to translate an RGB color space format video signal to a YUV color space format video signal; and, one or more scaling modules to adjust the size and/or resolution of the received video signal 135 to best match the display capabilities of the video display device 130. In one or more specific embodiments, the one or more video processing modules 170 and the one or more modules 150 can be disposed, in whole or in part, in, on, or about one or more graphical processing units ("GPUs"). The one or more GPUs can, in turn, be disposed in, on, or about one or more chips or chip sets distributed in, on, or about the one or more video display devices 130, the one or more video capture devices 140.

In one or more embodiments, the one or more conferencing devices 110 can include any device, any system, or any combination of systems and/or devices suitable for the generation of a captured video signal 145 and the display of one or more received video signals 135. In one or more embodiments, the one or more conferencing devices can include, but are not limited to, one or more laptop computers, one or more portable computers, one or more handheld electronic devices such as portable digital assistants ("PDAs") or cellular telephonic devices; desktop computers, workstations, or any combination thereof. In one or more embodiments, the captured video signal 145, the received video signal 135, and the collective video signals 160 transmitted through the one or more networks 120 can be in any format presently known or developed in the future. Typical video signal formats can include, but are not limited to, an AVI video format, a WMV video format, an MPEG video format; an ATSC video format; an NTSC video format; a PAL video format; or the like.

Figures 2A, 2B, 2C:
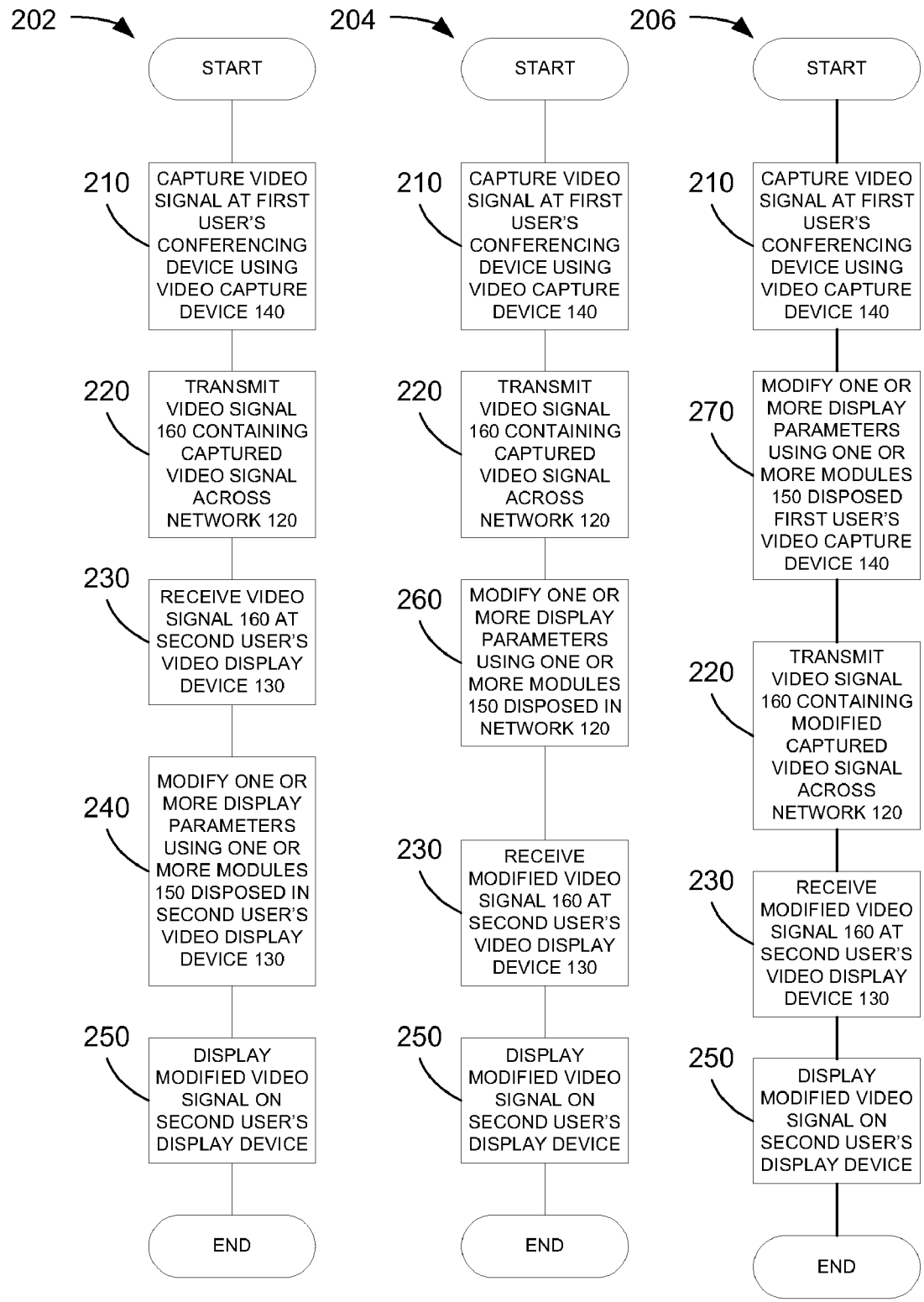
FIG. 2A is a flow chart depicting an illustrative method for equalizing video signals across a network, according to one or more embodiments described herein.
FIG. 2B is a flow chart depicting another illustrative method for equalizing video signals across a network, according to one or more embodiments described herein.
FIG. 2C is a flow chart depicting yet another illustrative method for equalizing video signals across a network, according to one or more embodiments described herein.

FIG. 2A is a flow chart depicting an illustrative method 200 for equalizing video signals across a network, according to one or more embodiments. In one or more embodiments, at a first step 210, a video signal can be captured using a first conferencing system video capture device 140. The captured video signal 145 can, in step 220, be transmitted as a video signal 160 across the one or more networks 120. The transmitted video signal 160 can, in step 230, be received at one or more second conferencing devices 110. The received video signal 135 can, in step 240, be introduced to one or more modules 150 disposed in, on, or about the one or more video display devices 130 operatively coupled to the one or more second conferencing devices 110. In step 240, one or more display parameters of the received video signal 135 can be adjusted or otherwise modified to fall within a predetermined range. A similar modification can be made on every video signal 160 received by the second video display device 130, thereby creating a plurality of received video signals 135, with all or a portion sharing similar display parameters, yet different video content based upon the origin of the first conferencing device 110. Finally, in step 250, the one or more modified video signals can be displayed on the second user's video display device 130.

FIG. 2B is a flow chart depicting another illustrative method 204 for equalizing video signals across a network, according to one or more embodiments. Similar to FIG. 2A, at a first step 210, a video signal can be captured using a first conferencing system video capture device 140. The captured video signal 145 can, in step 220, be transmitted as a video signal 160 across the one or more networks 120. While being transmitted across the one or more networks 120, the video signal can, in step 260, be introduced to one or more modules 150 disposed in, on, or about the one or more networks 120. In step 270, one or more display parameters of the video signal 160 can be adjusted or otherwise modified to fall within a predetermined range. The now modified video signal 160 can, in step 230, be received at one or more second conferencing devices 110. Finally, in step 250, the one or more modified video signals can be displayed on the video display device 130.

FIG. 2C is a logic flow diagram depicting yet another illustrative method 204 for equalizing video signals across a network according to one or more embodiments. Similar to FIG. 2A, at a first step 210, a video signal can be captured using a first conferencing system video capture device 140. The captured video signal 145 can, in step 270, be introduced to one or more modules 150 disposed in, on, or about the one or more video capture devices attached to the first conferencing device 110. In step 270, one or more display parameters of the captured video signal 145 can be adjusted or otherwise modified to fall within a predetermined range. The now modified captured video signal 145 can, in step 220, be transmitted as a video signal 160 across the one or more networks 120. The video signal 160 can, in step 230, be received at one or more second conferencing devices 110. Finally, in step 250, the one or more modified video signals can be displayed on the video display device 130.

Figure 3:
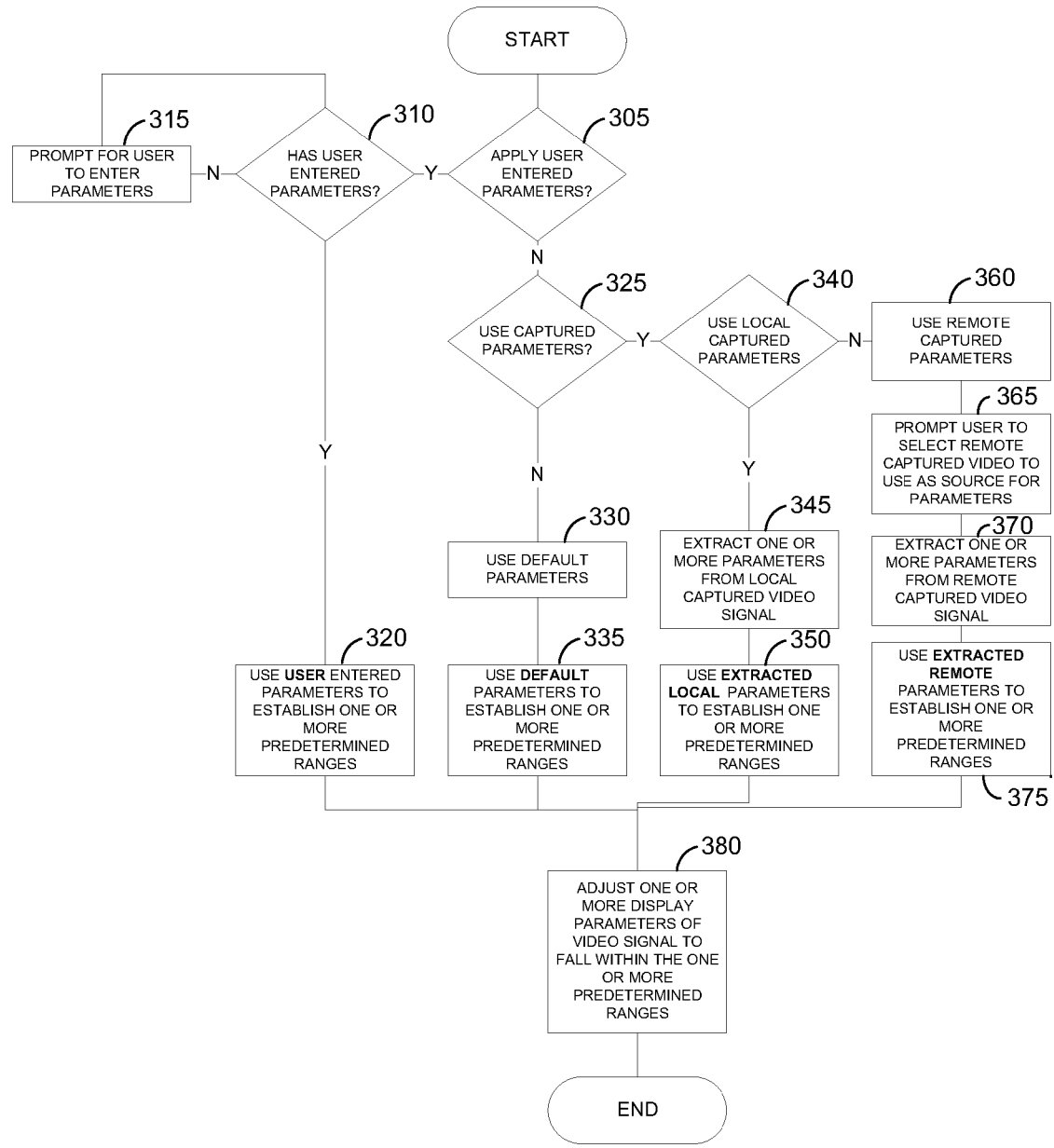
FIG. 3 is a logic flow diagram depicting an illustrative method for ascertaining the predetermined ranges for the display parameters according to one or more embodiments described herein.

FIG. 3 is a logic flow diagram depicting an illustrative method for ascertaining the predetermined ranges for the display parameters according to one or more embodiments. In one or more embodiments, the one or more modules 150 can determine which predetermined ranges to apply based upon a logical process similar to that described with reference to FIG. 3. In one or more embodiments, the one or more modules can ascertain whether the conferencing system 110 user desires to use one or more user entered predetermined ranges in step 310.

After confirming that the conferencing device user desires to employ one or more user-defined predetermined ranges, the one or more modules 150 can confirm the entry of one or more parameters in step 310. If the conferencing device user has not entered one or more parameters, the one or more modules 150 can, in step 315, prompt the conferencing device user to enter the necessary parameters. In one or more specific embodiments, the selection and/or entry of user-defined parameters in step 315 can be facilitated by having the one or more modules 150 provide descriptive rather than technical choices for selection by the conference device user. For example, rather than asking the conference device user to enter a color temperature range, the one or more modules 150 can instead ask the conference device user whether they would like the conference attendees to appear as though the other were either outdoors or indoors, afterwards selecting a color temperature based upon the user's selection. After entering one or more user-defined parameters, in step 320, the one or more modules 150 can form, developer otherwise establish the predetermined ranges based upon the user-defined parameters entered in step 315.

If the conferencing device user instead, in step 325, elects to use one or more captured parameters as the basis for determining the one or more predetermined ranges, the conferencing device user must decide whether to employ local captured parameters in step 340 or remote captured parameters 360. If the conferencing device user elects to use local captured parameters as the basis for the predetermined ranges, the one or more modules 150 can extract the necessary local captured video parameters from the local captured video signal 145 in step 345, followed by using the extracted local captured video parameters to develop the one or more predetermined ranges in step 350.

Alternatively, in the conferencing device user elected to use one or more sets of remote captured video parameters, in step 365 the one or more modules can prompt the conferencing device user to select a remote captured video signal to serve as the basis for establishing the one or more predetermined ranges. In one or more embodiments, the one or more modules 150 can extract the necessary remote captured video parameters from the user designated remote captured video signal 145 in step 370, followed by using the extracted remote captured video parameters to develop the one or more predetermined ranges in step 375. Finally, in step 380, the one or more modules 150 can use the predetermined range to modify or otherwise adjust the one or more video signals 160.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A conferencing system comprising:
   a plurality of conferencing devices, wherein each conferencing device is to bi-directionally communicate one or more video signals across a network, and
   wherein each conferencing device comprises
      a video display device;
      a video capture device; and
      one or more modules to at least one of modify one or more display parameters of all or a portion of the video signals transmitted by the respective conferencing device and modify one or more display parameters of all or a portion of the video signals received by the respective conferencing device,
         wherein the one or more modules modify the one or more display parameters of all or a portion of the video signals such that the color, brightness, and sharpness of the video displayed on the video display device of each of the plurality of conferencing devices are substantially the same, and
         wherein the one or more modules further modify the one or more display parameters of all or a portion of the video signals such that the depth of field of the video displayed on the video display device of each of the plurality of conferencing devices is substantially the same.

2. The conferencing system of claim 1, wherein the one or more modules further modify the one or more display parameters of all or a portion of the video signals such that the white balance of the video displayed on the video display device of each of the plurality of conferencing devices is substantially the same.

3. The conferencing system of claim 1, wherein the one or more modules modify the color by modifying at least one of the color level and color temperature.

4. The conferencing system of claim 1, wherein the one or more modules further modify the one or more display parameters of all or a portion of the video signals such that a facial size of each person in the video displayed on the video display device of each of the plurality of conferencing devices is substantially the same.

5. The conferencing system of claim 1, wherein the one or more modules further modify the one or more display parameters of all or a portion of the video signals such that at least one of the focal length and focal range of the video displayed on the video display device of each of the plurality of conferencing devices is substantially the same.

6. The conferencing system of claim 1, wherein the plurality of conferencing devices are mobile telephonic devices.

7. The conferencing system of claim 1, wherein the plurality of conferencing devices are at least one of mobile telephonic devices and laptop computers.

8. A conferencing device comprising:
   a video display device to display a video signal;
   a video capture device; and
   one or more modules to detect one or more display parameters of all or a portion of video signals at a remote conferencing device and modify one or more display parameters of all or a portion of video signals at the conferencing device based at least in part on the detected one or more display parameters at the remote conferencing device,
      wherein the one or more display parameters of all or a portion of video signals at the remote conferencing device comprise at least one of color, brightness, and sharpness, and
      wherein the one or more display parameters of all or a portion of video signals at the remote conferencing device further comprise at least one of depth of field, white balance, focal length, and focal range in addition to at least one of color, brightness, and sharpness.

9. The conferencing device of claim 8, wherein the one or more display parameters of all or a portion of video signals at the remote conferencing device further comprise a facial size of each person in the video displayed on the remote conferencing device in addition to at least one of color, brightness, and sharpness.

10. The conferencing device of claim 8, wherein the video display device of the conferencing device is to display video in accordance with the modified one or more display parameters of all or a portion of video signals at the conferencing device that are based at least in part on the detected one or more display parameters at the remote conferencing device.

11. The conferencing device of claim 8, wherein the conferencing device is one of a mobile telephonic device, laptop computer, and desktop computer.

12. The conferencing device of claim 8, wherein the one or more modules modify the one or more display parameters of all or a portion of video signals at the conferencing device such that they are substantially the same as the detected one or more display parameters at the remote conferencing device.

13. A mobile telephonic device comprising:
   a video display device;
   a video capture device; and
   one or more modules to detect one or more display parameters of all or a portion of video signals at a remote mobile telephonic device and modify one or more display parameters of all or a portion of video signals at the mobile telephonic device based at least in part on the detected one or more display parameters at the remote mobile telephonic device,
      wherein the video display device of the mobile telephonic device is to display video in accordance with the modified one or more display parameters of all or a portion of video signals at the mobile telephonic device that are based at least in part on the detected one or more display parameters at the remote mobile telephonic device,
      wherein the one or more display parameters of all or a portion of video signals at the remote mobile telephonic device comprise at least one of color, brightness, and sharpness,
      wherein the one or more display parameters of all or a portion of video signals at the remote mobile telephonic device further comprise depth of field in addition to at least one of color, brightness, and sharpness.

14. The mobile telephonic device of claim 13, wherein the one or more display parameters of all or a portion of video signals at the remote mobile telephonic device further comprise a facial size of each person in the video displayed on the remote mobile telephonic device in addition to at least one of color, brightness, and sharpness.

15. The mobile telephonic device of claim 13, wherein the one or more display parameters of all or a portion of video signals at the remote mobile telephonic device further comprise white balance in addition to at least one of color, brightness, and sharpness.

16. The mobile telephonic device of claim 13, wherein the one or more display parameters of all or a portion of video signals at the remote mobile telephonic device further comprise focal length in addition to at least one of color, brightness, and sharpness.

17. The mobile telephonic device of claim 13, wherein the one or more modules modify the one or more display parameters of all or a portion of video signals at the mobile telephonic device such that they are substantially the same as the detected one or more display parameters at the remote mobile telephonic device.

* * * * *